3,529,980
BOROSILICATE OPTICAL CROWN GLASS WITH ANOMALOUS PARTIAL DISPERSIONS WITH NEGATIVE $\Delta v_e$ DISPERSION VALUES
Heinz Bromer, Hermannstein, Kreis Wetzlar, and Norbert Meinert, Wetzlar, Germany, assignors to Ernst Leitz GmbH., Wetzlar, Germany
Continuation-in-part of application Ser. No. 542,035, Apr. 12, 1966. This application Apr. 28, 1967, Ser. No. 634,746
Claims priority, application Germany, May 3, 1966, L 53,490
Int. Cl. C03c 3/04, 3/08
U.S. Cl. 106—54                     4 Claims

ABSTRACT OF THE DISCLOSURE

Optical crown glasses with anomalous partial dispersion with negative $\Delta v_e$ values and improved chemical resistance properties, with mean refractive indices $n_e$ from 1.54 to 1.58 and 1.61 to 1.64 can be produced from a mixture consisting essentially of 24 to 52 mol percent $SiO_2$; 25 to 35 mol percent $B_2O_3$; 10 to 25 mol percent selected from the group consisting of oxides of alkali elements; 2 to 8 mol percent $Al_2O_3$; up to 10 mol percent selected from the group consisting of oxides of the bivalent elements zinc, cadmium, and lead; 1 to 7 mol percent selected from the group consisting of oxides of tantalum and niobium; and optional additives up to 15 mol percent selected from the group consisting of oxides of zirconium, lanthanum and tungsten.

METHODS OF PRODUCING SAID GLASSES

Said glasses are combinable with glasses with equivalent positive $\Delta v_e$ values for apochromatic correction without influencing thereby other corrective conditions of an optical system.

CROSS-REFERENCES TO RELATED APPLICATIONS

The present invention is a continuation-in-part of copending U.S. Pat. application Ser. No. 542,035 of the same co-inventors, filed Apr. 12, 1966, which issued as U.S. Pat. No. 3,451,829 and the priorities to which that patent is entitled are claimed for all subject matter common therewith.

BACKGROUND OF THE INVENTION

Field of the invention

Optical glasses with mean refractive index values $n_e$ between 1.54 to 1.58 and 1.61 to 1.64, with dispersion values $v_e$ of 45 to 60, and with negative $\Delta v_e$ values, their compositions, methods to produce them and their combination with glasses having positive $\Delta v_e$ values.

DESCRIPTION OF THE PRIOR ART

Glasses with anomalous partial dispersion are known to the art. A basic differentiation is made as to whether these glasses, with respect to their partial dispersion, have higher or lower values than the normal glasses.

Normal glasses are defined as having a partial dispersion $\vartheta'g$ which over a wide range is in approximately linear dependence from the mean dispersion value $V_e$. Ordinarily, the aberration with respect to partial dispersion is indicated by the difference of the $v_e$ value, with identical $\vartheta'$ value, between a normal glass and a glass with anomalous partial dispersion, and this difference is designated by $\Delta v_e$. Negative $\Delta v_e$ values are then equivalent to a lower partial dispersion, positive $\Delta v_e$ values are equivalent to a higher partial dispersion.

Persons calculating the optical characteristics, namely the mean refractive index $n_e$ and the Abbe number (relative dispersion) $v_e$, i.e., for the refractive index values between $n_e = 1.52$ and $n_e = 1.64$, and for the dispersion values of $v_e = 40$ to $v = 60$ must maintain certain limits with respect to the remaining important values. They seek to obtain, for glasses having positive $\Delta v_e$ values, glasses of the same optical position with negative $\Delta v_e$ values. A combination of two such glasses having different $\Delta v_e$ values makes possible a predetermined apochromatic correction, without influencing thereby other correction conditions of an optical system.

Glasses having positive $\Delta v_e$ values are described in applicant's copending application Ser. No. 542,035, filed Apr. 12, 1966, now U.S. Pat. No. 3,451,829.

Glasses having negative $\Delta v_e$ values are described in U.S. Pat. No. 2,866,712. These glasses comprise as a vitrifying agent boric acid. Another type negative $\Delta v_e$ glass employs in addition thereto silicic acid. The proportions of boric acid generally are above 30% by weight and the additional proportion of silicic acid is up to 30% by weight. A further component in the known glasses are alkali oxides and lanthanum oxide, or zirconium oxide.

That applicant's invention relates to an optical crown glass with anomalous partial dispersion $$\vartheta'_g = \frac{n_g - n_{F'}}{n_{F'} - n_{C'}}$$

having negative $\Delta v_e$ value and melted from a mix consisting by weight of the fusion of from 30% to 70% of boric acid anhydride, 2% to 30% of silica, 10% to 25% of zirconium oxide and over 10% of alkali metal oxide.

The inventors found that these glasses of the prior art have unsatisfactory chemical resistances, their compositions strongly tend to devitrify, and difficulties are encountered when melting them in commercially feasible batches.

SUMMARY OF THE INVENTION

Thus the objects of the invention are: to avoid the shortcomings of the prior art glasses, mentioned above; to develop novel glasses, methods of producing them and compositions for making them; and to develop glasses of the type mentioned, which make it possible to combine them into combinations of two such glasses having different $\Delta v_e$ values to permit a predetermined apochromatic correction, without adversely influencing other corrective conditions of an optical system.

Other objects and many of the attendant advantages of the present invention will become apparent to those skilled in the art from the following specification taken in conjunction with the various tables recited there-in, claims and drawing.

BRIEF DESCRIPTION OF THE DRAWINGS

The only figure of the drawings is a flow chart of the method of producing optical crown glass with anomalous dispersion characterized by a $-\Delta v_e$ value.

DESCRIPTION OF THE PREFERRED EMBODIMENTS

According to the invention, the glasses are melted from mixtures comprising as essential ingredients:

24–52 mol percent $SiO_2$,
25–35 mol percent $B_2O_3$,
10–25 mol percent selected from the group consisting of oxides of the alkali elements,
2–8 mol percent $Al_2O_3$, up to 10 mol percent selected from the group consisting of oxides of the bivalent elements zinc, cadmium and lead,

FLOW CHART of the method of producing optical crown glass with anomalous dispersion $-\Delta v_e$ value

1.) PREPARING A MIXTURE OF essential ingredients:

24-52 mol % $SiO_2$
   25-35 mol % $B_2O_3$
   10-25 mol % selected from the group consisting of oxides of alkali elements
   2-8 mol % $Al_2O_3$
   up to 10 mol % selected from the group consisting of oxides of the bivalent elements zinc, cadmium & lead
   1-7 mol % selected from the group consisting of oxides of tantalum and niobium optional additives:

selected from the group consisting of oxides of zirconium, lanthanum & tungsten up to a total proportion of 15 mol %

2.) MIXING THOROUGHLY

3.) HEATING between 1250°C & 1300°C

4.) MELTING THE MIXTURE

5.) ELEVATING THE TEMPERATURE to about between 1350°C to 1420°C

6.) REFINING THE MELT under constant stirring for about 150 to 200 minutes

7.) LOWERING THE TEMPERATURE under stirring to between 1100°C and 1200°C

8.) FURTHER LOWERING THE TEMPERATURE without stirring to between 850°C and 1150°C 9.) CASTING THE GLASS at the later temperature 10.) COOLING it 11.) TEMPERING it.

INVENTORS:
HEINZ BROEMER and
NORBERT MEINERT

BY *[signature]*

ATTORNEY

TABLE 2.—EXAMPLES FOR GLASSES OF MEAN REFRACTIVE INDICES $n_e$ of from 1.54 to 1.58, with dispersion values $v_e$ of 55 to 60

Mol Percent

| Melt No. | SiO2 | B2O3 | Li2O | Na2O | ZnO | Al2O3 | ZrO2 | Ta2O5 | WO3 | $n_e$ | $v_e$ | $\vartheta'$ | $\Delta v_e$ |
|---|---|---|---|---|---|---|---|---|---|---|---|---|---|
| 13 | 42.6 | 24.5 | 12.8 | 12.4 | 0.4 | 6.3 | 0.3 | 0.4 | 0.3 | 1.5429 | 59.8 | 4,703 | −10.6 |
| 14 | 44.8 | 26.0 | 17.9 | 2.2 | 0.4 | 6.6 | 0.3 | 1.5 | 0.3 | 1.5574 | 56.6 | 4,772 | −8.0 |
| 15 | 41.0 | 31.1 | 14.1 | 4.6 | 0.4 | 6.2 | 0.3 | 2.0 | 0.3 | 1.5568 | 55.0 | 4,788 | −8.4 |
| 16 | 40.1 | 33.2 | 14.3 | 2.3 | 0.4 | 6.8 | 0.3 | 1.9 | 0.7 | 1.5504 | 55.1 | 4,785 | −8.5 |
| 17 | 40.0 | 33.2 | 14.3 | 2.3 | 0.4 | 6.8 | 0.3 | 1.8 | 0.9 | 1.5489 | 55.1 | 4,814 | −6.2 |
| 18 | 39.6 | 30.1 | 18.2 | 4.4 | 0.4 | 4.7 | 0.3 | 2.0 | 0.3 | 1.5681 | 55.8 | 4,789 | −7.5 |
| 19 | 39.9 | 30.2 | 15.9 | 5.5 | 0.4 | 4.7 | 1.4 | 1.7 | 0.3 | 1.5648 | 55.8 | 4,788 | −7.9 |
| 20 | 38.5 | 29.2 | 22.0 | 2.1 | 0.4 | 4.6 | 1.3 | 1.6 | 0.3 | 1.5749 | 55.9 | 4,796 | −6.6 |
| 21 | 39.5 | 29.9 | 15.8 | 5.5 | | 4.7 | 3.0 | 1.3 | 0.3 | 1.5665 | 55.3 | 4,795 | −7.5 |
| 22 | 39.2 | 29.8 | 15.7 | 5.5 | | 4.6 | 3.8 | 1.1 | 0.3 | 1.5671 | 55.4 | 4,775 | −9.0 |
| 23 | 39.2 | 29.8 | 15.6 | 5.4 | | 4.6 | 4.1 | 1.0 | 0.3 | 1.5669 | 55.1 | 4,723 | −13.6 |
| 24 | 39.2 | 29.8 | 15.7 | 5.4 | | 4.6 | 3.8 | 0.9 | 0.6 | 1.5661 | 55.6 | 4,789 | −7.7 |
| 25 | 37.7 | 34.4 | 14.4 | 3.4 | 0.4 | 6.9 | 0.3 | 1.9 | 0.6 | 1.5518 | 54.9 | 4,792 | −9.0 |

Weight Percent

| Melt No. | SiO2 | B2O3 | Li2O | Na2O | ZnO | Al2O3 | ZrO2 | Ta2O5 | WO3 | $n_e$ | $v_e$ | $\vartheta'$ | $\Delta v_e$ |
|---|---|---|---|---|---|---|---|---|---|---|---|---|---|
| 13 | 40.0 | 27.0 | 6.0 | 12.0 | 0.5 | 10.0 | 0.5 | 3.0 | 1.0 | 1.5429 | 59.8 | 4,703 | −10.6 |
| 14 | 40.0 | 27.0 | 8.0 | 2.0 | 0.5 | 10.0 | 0.5 | 11.0 | 1.0 | 1.5574 | 56.6 | 4,772 | −8.0 |
| 15 | 35.0 | 31.0 | 6.0 | 4.0 | 0.5 | 9.0 | 0.5 | 13.0 | 1.0 | 1.5568 | 55.0 | 4,788 | −8.4 |
| 16 | 34.0 | 33.0 | 6.1 | 2.0 | 0.5 | 9.9 | 0.5 | 12.0 | 2.0 | 1.5504 | 55.1 | 4,785 | −8.5 |
| 17 | 34.0 | 33.0 | 6.1 | 2.0 | 0.5 | 9.9 | 0.5 | 11.0 | 3.0 | 1.5489 | 55.1 | 4,814 | −6.2 |
| 18 | 35.0 | 31.0 | 8.0 | 4.0 | 0.5 | 7.0 | 0.5 | 13.0 | 1.0 | 1.5681 | 55.8 | 4,789 | −7.5 |
| 19 | 35.0 | 31.0 | 7.0 | 5.0 | 0.5 | 7.0 | 2.5 | 11.0 | 1.0 | 1.5648 | 55.5 | 4,788 | −7.9 |
| 20 | 35.0 | 31.0 | 10.0 | 2.0 | 0.5 | 7.0 | 2.5 | 11.0 | 1.0 | 1.5749 | 55.9 | 4,796 | −6.6 |
| 21 | 35.0 | 31.0 | 7.0 | 5.0 | | 7.0 | 5.5 | 8.5 | 1.0 | 1.5665 | 55.3 | 4,795 | −7.5 |
| 22 | 35.0 | 31.0 | 7.0 | 5.0 | | 7.0 | 7.0 | 7.0 | 1.0 | 1.5671 | 55.4 | 4,775 | −9.0 |
| 23 | 35.0 | 31.0 | 7.0 | 5.0 | | 7.0 | 7.5 | 6.5 | 1.0 | 1.5669 | 55.1 | 4,723 | −13.6 |
| 24 | 35.0 | 31.0 | 7.0 | 5.0 | | 7.0 | 7.0 | 6.0 | 2.0 | 1.5661 | 55.6 | 4,789 | −7.7 |
| 25 | 32.0 | 34.0 | 6.1 | 3.0 | 0.5 | 9.9 | 0.5 | 12.0 | 2.0 | 1.5518 | 54.9 | 4,792 | −9.0 |

TABLE 3.—EXAMPLES FOR GLASSES OF MEAN REFRACTIVE INDICES $n_e$ of from 1.61 to 1.64, with dispersion values $v_e$ of 45 to 50

Mol Percent

| Melt No. | SiO2 | B2O3 | Li2O | Na2O | ZnO | PbO | Al2O3 | ZrO2 | Ta2O5 | WO3 | Nb2O5 | $n_e$ | $v_e$ | $\vartheta'$ | $\Delta v_e$ |
|---|---|---|---|---|---|---|---|---|---|---|---|---|---|---|---|
| 27 | 29.1 | 29.1 | 20.9 | | 5.0 | 1.4 | 7.6 | 3.2 | 3.7 | | | 1.6280 | 46.7 | 4,926 | −6.0 |
| 28 | 28.1 | 30.3 | 25.6 | | 1.1 | | 7.4 | 3.1 | 3.6 | 0.8 | | 1.6191 | 48.7 | 4,874 | −7.9 |
| 29 | 34.5 | 29.2 | 17.0 | 3.6 | 4.7 | | 2.7 | 3.0 | 0.8 | | 4.5 | 1.6351 | 43.1 | 5,010 | −3.5 |
| 30 | 37.5 | 27.7 | 18.5 | 2.3 | 4.4 | | 2.6 | 2.9 | 0.4 | | 3.7 | 1.6211 | 45.6 | 4,934 | −6.5 |
| 31 | 35.0 | 27.7 | 23.2 | | 1.8 | | 4.7 | 2.8 | 0.4 | | 4.4 | 1.6277 | 44.7 | 4,960 | −5.3 |
| 32 | 33.8 | 28.6 | 24.0 | | 4.6 | | 2.7 | 2.9 | 3.4 | | | 1.6210 | 49.6 | 4,872 | −7.1 |
| 33 | 34.0 | 28.8 | 20.5 | | 1.1 | | 4.5 | 4.4 | 2.6 | 4.1 | | 1.6157 | 47.1 | 4,908 | −6.9 |
| 34 | 32.6 | 27.6 | 21.0 | 1.3 | 3.0 | | 3.4 | 3.2 | 2.7 | 5.2 | | 1.6262 | 46.1 | 4,912 | −7.6 |
| 35 | 31.5 | 27.6 | 22.7 | 1.3 | 0.6 | | 4.3 | 3.9 | 3.2 | 4.9 | | 1.6287 | 45.8 | 4,934 | −6.2 |

Weight Percent

| Melt No. | SiO2 | B2O3 | Li2O | Na2O | ZnO | PbO | Al2O3 | ZrO2 | Ta2O5 | WO3 | Nb2O5 | $n_e$ | $v_e$ | $\vartheta'$ | $\Delta v_e$ |
|---|---|---|---|---|---|---|---|---|---|---|---|---|---|---|---|
| 27 | 21.9 | 25.6 | 7.9 | | 5.1 | 4.0 | 9.8 | 4.9 | 20.8 | | | 1.6280 | 46.7 | 4,926 | −6.0 |
| 28 | 21.9 | 27.6 | 9.9 | | 3.1 | | 9.8 | 4.9 | 20.8 | 2.0 | | 1.6191 | 48.7 | 4,874 | −7.9 |
| 29 | 27.9 | 27.6 | 6.9 | 3.0 | 5.1 | | 3.8 | 4.9 | 4.8 | | 16.0 | 1.6351 | 43.1 | 5,010 | −3.5 |
| 30 | 31.9 | 27.6 | 7.9 | 2.0 | 5.1 | | 3.8 | 4.9 | 2.8 | | 14.0 | 1.6211 | 45.6 | 4,934 | −6.5 |
| 31 | 29.9 | 27.6 | 9.9 | | 2.1 | | 6.8 | 4.9 | 2.8 | | 16.0 | 1.6277 | 44.7 | 4,960 | −5.3 |
| 32 | 27.9 | 27.6 | 9.9 | | 5.1 | | 3.8 | 4.9 | 20.8 | | | 1.6210 | 49.6 | 4,872 | −7.1 |
| 33 | 25.9 | 25.6 | 7.9 | | 1.1 | | 5.8 | 6.9 | 14.8 | 12.0 | | 1.6157 | 47.1 | 4,908 | −6.9 |
| 34 | 24.4 | 24.1 | 7.9 | 1.0 | 3.1 | | 4.4 | 4.9 | 15.2 | 15.0 | | 1.6262 | 46.1 | 4,912 | −7.6 |
| 35 | 23.4 | 24.1 | 8.4 | 1.0 | 0.6 | | 5.4 | 5.9 | 17.2 | 14.0 | | 1.6287 | 45.8 | 4,934 | −6.2 |

Chemical analyses of the glasses produced did not show any significant chemical changes in their compositions as compared with the compositions of the mixtures from which they were melted.

In accordance with the optical requirements of a particular case, lenses with the positive and negative $\Delta v_e$ values may be spaced from each other, pasted together or cast as an integral laminated unit of at least one positive and one negative layer, or of a plurality of such layers, alternating or grouped together by their positive and negative values.

In applicants' copending patent application Ser. No. 542,035, an optical crown glass with anomalous partial dispersion $$\vartheta'_g = \frac{n_g - n_{F'}}{n_{F'} - n_{C'}}$$

has been disclosed, having a positive deviation $n$, $+\Delta v_e$. It is melted from a mix which consists by weight of aluminium phosphates from 45 to 55 percent, and alkaline earth phosphates from 5 to 10 percent as glass formers and optionally including additives selected from the group consisting by weight of alkali oxides from 10 to 20 percent, oxides of Mg, Ca, Sr, Ba, Zn, Cd from 15 to 30 percent and up to 10 percent of $TiO_2$.

We claim:
1. Optical crown glass with anomalous partial dispersion characterized by a $-\Delta v_e$ value, melted from a mixture consisting essentially of:

24–52 mol percent $SiO_2$,
25–35 mol percent $B_2O_3$,
10–25 mol percent selected from the group consisting of oxides of alkali elements,
2–8 mol percent $Al_2O_3$,
Up to 10 mol percent selected from the group consisting of oxides of the bivalent elements zinc, cadmium and lead,
1–7 mol percent selected from the group consisting of oxides of tantalum and niobium.

2. Optical crown glass, with anomalous partial dispersion characterized by a $-\Delta \nu_e$ value, melted from a mixture consisting essentially of:

24–52 mol percent $SiO_2$,
25–35 mol percent $B_2O_3$,
10–25 mol percent selected from the group consisting of oxides of alkali elements,
2–8 mol percent $Al_2O_3$,
Up to 15 mol percent selected from the group consisting of oxides of the bivalent elements zinc, cadmium and lead,
1–7 mol percent selected from the group consisting of oxides of tantalum and niobium; and
Up to 15 mol percent selected from the group consisting of oxides of zirconium, lanthanum and tungsten.

3. Optical crown glass as claimed in claim 1, said mixture consisting of

| Composition of mixture | Mol percent | Weight percent |
|---|---|---|
| $SiO_2$ | 43.9 | 35.50 |
| $B_2O_3$ | 30.1 | 28.45 |
| $Li_2O$ | 10.5 | 4.25 |
| $Na_2O$ | 3.0 | 2.50 |
| $ZnO$ | 0.9 | 1.00 |
| $Al_2O_3$ | 6.5 | 9.00 |
| $ZrO_2$ | 2.4 | 4.00 |
| $Ta_2O_5$ | 2.3 | 13.80 |
| $WO_3$ | 0.4 | 1.50 |
| $As_2O_3$ | | (0.25) |

4. Optical crown glass as claimed in claim 1, said mixture consisting of

| Composition of mixture | Mol percent | Weight percent |
|---|---|---|
| $SiO_2$ | 30.1 | 21.9 |
| $B_2O_3$ | 30.1 | 25.6 |
| $Li_2O$ | 18.7 | 6.8 |
| $Na_2O$ | 1.5 | 1.1 |
| $PbO$ | 2.6 | 7.0 |
| $ZnO$ | 3.1 | 3.1 |
| $La_2O_3$ | 0.3 | 1.3 |
| $Al_2O_3$ | 7.4 | 9.0 |
| $ZrO_2$ | 2.3 | 3.4 |
| $Ta_2O_5$ | 3.9 | 20.8 |

References Cited

UNITED STATES PATENTS

| | | | |
|---|---|---|---|
| 2,576,521 | 11/1951 | Kreidl et al. | 106—54 |
| 2,745,757 | 5/1956 | Geffcken | 106—54 |
| 2,866,712 | 12/1958 | Weissenberg et al. | 106—47 |
| 3,143,432 | 8/1964 | Brömer et al. | 106—54 |
| 3,174,871 | 3/1965 | Geffcken et al. | 106—54 |

FOREIGN PATENTS 863,352   3/1961   Great Britain.

HELEN M. McCARTHY, Primary Examiner

W. R. SATTERFIELD, Assistant Examiner

U.S. Cl. X.R.

106—47, 53